United States Patent
Naka et al.

(10) Patent No.: US 8,750,866 B2
(45) Date of Patent: Jun. 10, 2014

(54) FEMTOCELL BASE STATION AND ACCESS MODE SWITCHING METHOD

(75) Inventors: Katsuyoshi Naka, Osaka (JP); Takeshi Kanazawa, Kanagawa (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/813,010

(22) PCT Filed: Jul. 8, 2011

(86) PCT No.: PCT/JP2011/003944
§ 371 (c)(1),
(2), (4) Date: Jan. 29, 2013

(87) PCT Pub. No.: WO2012/017601
PCT Pub. Date: Feb. 9, 2012

(65) Prior Publication Data
US 2013/0130679 A1 May 23, 2013

(30) Foreign Application Priority Data
Aug. 3, 2010 (JP) .................................. 2010-174579

(51) Int. Cl.
*H04W 4/00* (2009.01)
(52) U.S. Cl.
USPC ......................................... 455/433; 455/411
(58) Field of Classification Search
CPC ... H04W 28/04; H04W 84/045; H04W 88/10; H04W 8/06
USPC .................................................. 455/411, 433
See application file for complete search history.

(56) References Cited

U.S. PATENT DOCUMENTS

| 8,442,571 B2* | 5/2013 | Jung et al. ..................... 455/518 |
| 2011/0105085 A1 | 5/2011 | Aoyagi |
| 2011/0317643 A1* | 12/2011 | Gaal et al. ..................... 370/329 |
| 2013/0244641 A1* | 9/2013 | Singh et al. ................ 455/422.1 |

FOREIGN PATENT DOCUMENTS

WO    2009/125799 A1    10/2009

OTHER PUBLICATIONS

3GPP TR 36.921 V9.0.0 (Mar. 2010), "FDD Home eNodeB (HeNB) Radio Frequency (RF) requirements analysis".
NTT DOCOMO, T-Mobile, CSG with limited open access, 3GPP TSG RAN WG2 #60, Tdoc-R2-075150, 3GPP, Nov. 9, 2007, p. 1-2.
International Search Report for PCT/JP2011/003944 dated Oct. 4, 2011.

* cited by examiner

*Primary Examiner* — Charles Shedrick
(74) *Attorney, Agent, or Firm* — Pearne & Gordon LLP

(57) ABSTRACT

A radio communication system includes a macrocell base station, and a femtocell base station provided in a macrocell. The femtocell base station includes: a measuring part which measures an uplink total received power from a radio terminal; a detecting part which detects a visitor macrocell radio terminal located in a vicinity of the femtocell base station operated by the access limited mode in accordance with the uplink total received power or an uplink interference signal power which can be derived from the uplink received power; and a control part which switches the femtocell base station from the access limited mode to the hybrid mode when the detecting part detects the visitor macrocell radio terminal. Accordingly, it is possible to improve the throughput for the visitor macrocell user.

8 Claims, 14 Drawing Sheets

FIG. 11

| MESSAGE TYPE | ID OF ADDRESSEE HNB | ID OF TRANSMISSION SOURCE HNB | NCL OF TRANSMISSION SOURCE HNB |

⟶ SEARCH CELL OF DIFFERENT FREQUENCY

----> DIFFERENT FREQUENCY HANDOVER TO f3 OR f4

FEMTOCELL BASE STATION AND ACCESS MODE SWITCHING METHOD

TECHNICAL FIELD

The present invention relates to a femtocell base station and an access mode switching method that improve a throughput of a visitor macrocell user.

BACKGROUND ART

An introduction of a micro radio base station (refer it to as a "femtocell base station (HNB: Home Node B)", hereinafter) to a cellular system such as WCDMA (Wideband Code Division Multiple Access) or LTE (Long Term Evolution) is studied. The femtocell base station can cover an area (refer it to as a "femtocell", hereinafter) having a radius of about several ten meters. The femtocell base station is provided in a building such as an ordinary home or an office having, for instance, a relatively bad propagation environment. As described above, in the cellular system, a high speed radio transmission in the femtocell area is anticipated even in the area were the propagation environment is bad.

For the existing cellular system, in a city part, a usual radio base station (refer it to as a "macrocell base station (MNB: Macro Node B)", hereinafter) is supposed to use all carrier frequencies included in a system frequency band retained by a communication enterpriser. Therefore, a carrier frequency exclusively used for the femtocell base station is hardly ensured. In this case, the femtocell base station is introduced in the form that the femtocell base station shares the frequency with an existing macrocell base station. Further, a practical use is made by applying an access limitation by a CSG (Closed Subscriber Group) mode in which only contractors or registrants of the femtocell base station can communicate by using the femtocell base station. The CSG mode is sometimes called, an access limitation mode or an access limited mode.

When the femtocell base station is introduced to the existing cellular system in accordance with these conditions, a mutual interference may be generated between a downlink radio channel to a radio terminal (MUE: Macro User Equipment) connected to the existing macrocell base station from the femtocell base station and a downlink radio channel to a radio terminal (HUE: Home User Equipment) connected to the femtocell base station from the existing macrocell base station. The radio terminal connected to the macrocell base station is sometimes called a "macrocell user", and the radio terminal connected to the femtocell base station is sometimes called a "femtocell user".

Further, when the macrocell user that does not receive an access permission from the femtocell base station stays in a house in which the femtocell base station is provided, an interference to the macro user by a downlink radio signal from the femtocell base station becomes the largest. When the macrocell user staying in the house in which the femtocell base station is provided does not receive the access permission from the femtocell base station, the macrocell user is called a "visitor macrocell user (vMUE: visitor MUE)", a "guest macrocell user" or a "customer macrocell user".

FIG. 13 is a diagram showing one example of a structure of a radio system having the femtocell base station provided in a coverage area (refer it to as a "macrocell", hereinafter) of the macrocell base station. A macrocell base station (MNB) 100 forms a macrocell 101 which covers a wide area having a radius of a cell of about 0.5 km to several km. In the radio system shown in FIG. 13, a macrocell user (MUE) 102 in the macrocell 101 communicates with the macrocell base station 100 by using a radio channel such as WCDMA, LTE or WLAN. Further, at an arbitrary position in the macrocell 101, a femtocell base station (HNB) 110 is provided and a femtocell 111 is formed as a range which can communicate with the femtocell base station 110. A radio terminal as a provider or a registrant of the femtocell base station 110 is located in the femtocell 111 and communicates with the femtocell base station 110 as a femtocell user (HUE) 112 when a receiving quality of the downlink radio signal from the femtocell base station 110 is a predetermined level or higher. Further, a visitor macrocell user (vMUE) 113 which does not receive the access permission from the femtocell base station 110, or which is not registered in the femtocell base station 110 and is located in the femtocell 111 communicates with the macrocell base station 100. The macrocell base station (MNB), the femtocell base station (HNB), the macrocell user (MUE) and the femtocell user (HUE) are supposed to make a communication by the same communication system (WCDMA/UMTS, CDMA 2000 (trademark), LTE, LTE-Advanced, WLAN, WiMAX (trademark) etc.). The macrocell base station meeting the LTE is sometimes called "MeNB". Further, the femtocell base station meeting the LTE is sometimes called "HeNB". Further, the radio base station is sometimes called an access point (AP). The femtocell base station is sometimes called a femtocell access point (FAP).

Patent Literature 1 discloses a method, as a method for reducing an interference to a macrocell user (a mobile station) from a femtocell base station (a radio base station for a home cell), in which a state of the femtocell base station is switched to either a limited state (a CLOSED state) which limits the mobile stations whose access to the femtocell base station is permitted or a semi-open state (a Semi-OPEN state or a Hybrid state) which does not limit an access permission to the femtocell base station by the mobile stations in accordance with predetermined conditions. Specifically, the method is disclosed in which the state is switched to the limited state when the number of the mobile stations which access to the femtocell base station or the number of the mobile stations to which an access right to the femtocell base station is given exceeds a predetermined number, and the state is switched to the semi-open state when the number of the mobile stations is smaller than the predetermined number.

Non-Patent Literature 1 discloses a method, as a method for reducing an interference to a macrocell user from a femtocell base station, in which an existence of the macrocell user is detected in the vicinity of the femtocell base station, and when the macrocell user is detected, a transmission power of the femtocell base station is adjusted. When the existence of the macrocell user is detected, the femtocell base station measures an uplink interference received power. When an interference received power to noise power (IoT: Interference over Thermal) is a predetermined value or higher, it is decided that the macrocell user is present in the vicinity of the femtocell base station.

CITATION LIST

Patent Literature

Patent Literature 1: WO 2009/125799 A1

Non-Patent Literature

Non-Patent Literature 1: 3GPP TR36.921 v9.0.0 (2010-03) "FDD Home eNodeB (HeNB) Radio Frequency (RF) requirements analysis"

SUMMARY OF INVENTION

Technical Problem

According to the method disclosed in Patent Literature 1, when the femtocell base station is in the semi-open state, a visitor macrocell user is permitted to access to the femtocell base station. In this case, an upper limit is set on the number of the mobile stations which can access to the femtocell station. Accordingly, when there are a lot of macrocell users in the vicinity of the femtocell base station in the semi-open state, if a lot of macrocell users switch a connection to the connection to the femtocell base station, the femtocell base station is switched to the limited state from the semi-open state due to the limitation of the number of access users. The femtocell base station in the limited state cannot permit the access of the visitor macrocell user. Therefore, ordinarily, the visitor macrocell user searches a neighboring cell having a different carrier frequency from a carrier frequency now in use (a different frequency cell search) and tries to do a different frequency hand over.

FIG. 14 is a conceptual view when the visitor macrocell user searches the different, frequency cells to make a different frequency hand over. In the example shown in FIG. 14, the visitor macrocell user vMUE searches neighboring cells having carrier frequencies f2 to f4 of all carrier frequencies f1 to f4 different from the carrier frequency f1 now in use (the different frequency search). The visitor macrocell user vMUE is handed over to the different frequency of the macrocell having the carrier frequency f2 or f5 which is not used by femtocell base stations HNB#1 and HNB#2.

However, while the different frequency hand over is completed, the visitor macrocell user receives a large interference by a downlink radio signal from the femtocell base station. Further, when all the carrier frequencies which can be used by a system are used by a group of the femtocell base stations including the femtocell base station itself and neighboring femtocell base stations, the visitor macrocell user cannot carry out the different frequency hand over. Thus, the visitor macrocell user continuously receives the interference by the femtocell base station. In the worst case, a communication is disconnected.

Further, according to the method disclosed in Non-Patent Literature 1, when the existence of the macrocell user is detected in the vicinity of the femtocell base station, the transmission power of the femtocell base station is reduced. Accordingly, amount of the interference to the macrocell user by a downlink radio signal from the femtocell base station can be lowered. When the detected macrocell user is a visitor macrocell user, namely, when the macrocell user stays in a house or the like, since to an power of a desired wave of a downlink radio channel from a macrocell base station, not only a propagation loss (it is also referred to as a "path loss") of a free space, but also an penetration loss by an outer wall of the house is applied, the power from the macrocell base station is rapidly damped. However, the interference power from the femtocell base station that the visitor macrocell receives does not receive an influence of the penetration loss by the outer wall of the house. Accordingly, even when the femtocell base station reduces the transmission power, the visitor macrocell user may possibly receive a large interference by the downlink radio signal from the femtocell base station. As described above, an interference control by reducing the power of the femtocell base station may be possibly insufficient for the visitor macrocell user.

As described above, since the visitor macrocell user receives the interference by the downlink radio signal from the femtocell base station even by either of the method disclosed in Patent Literature 1 and the method disclosed in Non-Patent Literature 1, a throughput of the visitor macrocell user is lowered.

It is an object of the present invention to provide a femtocell base station and an access mode switching method which can improve a throughput of a visitor macrocell user.

Solution to Problem

An aspect of the present invention provides a femtocell base station in a radio communication system having: a macrocell base station which can communicate with radio terminals using any of a plurality of carrier frequencies; and at least one femtocell base station provided in a macrocell in which the macrocell base station can communicate with the radio terminals, and capable of communicating with the radio terminals in an access limited mode in which only a specific radio terminal can access or a hybrid mode in which an access is not limited only to the specific radio terminal using any of the plurality of carrier frequencies, the femtocell base station including: a measuring part which measures an uplink total received power from radio terminals; a detecting part which detects a visitor macrocell radio terminal located in a vicinity of the femtocell base station operated by the access limited mode in accordance with the uplink total received power or an uplink interference signal power which can be derived from the uplink received power; and a control part which switches the femtocell base station from the access limited mode to the hybrid mode when the detecting part detects the visitor macrocell radio terminal.

In the femtocell base station, the detecting part recognizes that the visitor macrocell radio terminal is detected when a state is kept that the uplink total received power or the uplink interference signal power is a predetermined value or higher continuously for a predetermined duration or longer after the uplink total received power or the uplink interference signal power reaches the predetermined value or higher.

The femtocell base station includes a cell search part which carries out a cell search of all carrier frequencies on neighboring femtocell base stations as targets, and the detecting part recognizes that the visitor macrocell radio terminal is detected when the detecting part decides that all of the plurality of carrier frequencies are used by the femtocell base station and the neighboring femtocell base stations in accordance with a result of a search by the cell search part and if the uplink total received power or the uplink interference signal power is a predetermined value or higher.

The femtocell base station includes a transmission part which transmits auxiliary information to the visitor macrocell radio terminal through the macrocell base station when the detecting part decides that at least one of the plurality of carrier frequencies is not used by the femtocell base station in accordance with the result of the cell search of the cell search part, wherein the auxiliary information is information for handing over to another carrier frequency by the visitor macrocell radio terminal.

In the femtocell base station, the uplink interference signal power is derived by subtracting an uplink received power from the specific radio terminal previously registered in the femtocell base station from the uplink total received power.

In the femtocell base station, the predetermined duration indicates an average time required for the radio terminal to search a macrocell having another carrier frequency different from the carrier frequency used by the radio terminal and then hand over to the other carrier frequency.

The femtocell base station includes an obtaining part which obtains a propagation loss between the visitor macrocell radio terminal connected to the femtocell base station operated by the hybrid mode and the femtocell base station, and the control part switches the femtocell base station from the hybrid mode to the access limited mode when all propagation losses of the visitor macrocell radio terminal connected to the femtocell base station which are obtained by the obtaining part become a predetermined value or higher continuously for a predetermined duration or longer.

An aspect of the present invention provides an access mode switching method carried out in a radio communication system having: a macrocell base station which can communicate with radio terminals using any of a plurality of carrier frequencies; and at least one femtocell base station provided in a macrocell in which the macrocell base station can communicate with the radio terminals, and capable of communicating with the radio terminals in an access limited mode in which only a specific radio terminal can access or a hybrid mode in which an access is not limited only to the specific radio terminal using any of the plurality of carrier frequencies, the access mode switching method including: measuring an uplink total received power from radio terminals; and switching the femtocell base station from the access limited mode to the hybrid mode when a visitor macrocell radio terminal located in a vicinity of the femtocell base station operated by the access limited mode is detected in accordance with the uplink total received power or an uplink interference signal power which can be derived from the uplink received power.

Advantageous Effects of Invention

In the femtocell base station and the access mode switching method according to the present invention, the throughput of the visitor macrocell user can be improved.

BRIEF DESCRIPTION OF DRAWINGS

FIG. 11 is a conceptual diagram showing a data structure of auxiliary information that a femtocell base station (HNB) 800 transmits to a macrocell base station (MNB) 850.

MODES FOR CARRYING OUT INVENTION

Figure 1:
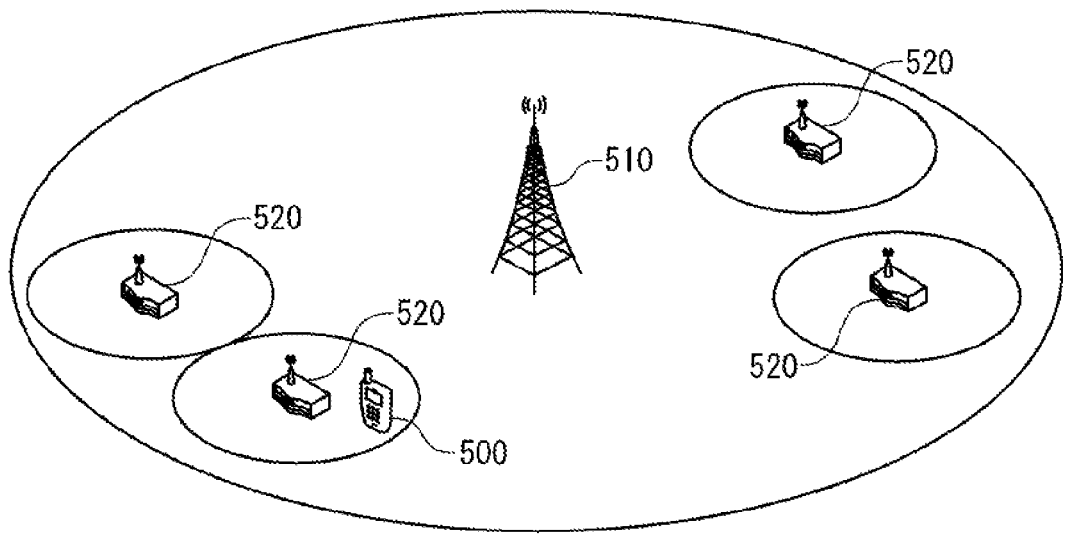
FIG. 1 is a block diagram showing a structure of a radio communication system in a first exemplar embodiment.

Now, exemplary embodiments of the present invention will be described below by referring to the drawings.

First Exemplary Embodiment

FIG. 1 is a block diagram showing a structure of a radio communication system in a first exemplary embodiment. As shown in FIG. 1, the radio communication system includes a radio terminal (UE) 500, a macrocell base station (MNB) 510 and a plurality of femtocell base stations (HNB) 520. The terminal and the base stations are operated by the same communication system (for instance, WCDMA, LTE, WLAN, etc.). Further, the femtocell base stations (HNB) 520 are respectively provided in a macrocell and operated by either a CSG mode or a hybrid mode. The femtocell base station 520 in the CSG mode limits the radio terminals which can access to the femtocell base station 520. Further, the femtocell base station 520 in the hybrid mode does not limit access permission to the femtocell base station 520 by the radio terminals.

Figure 2:
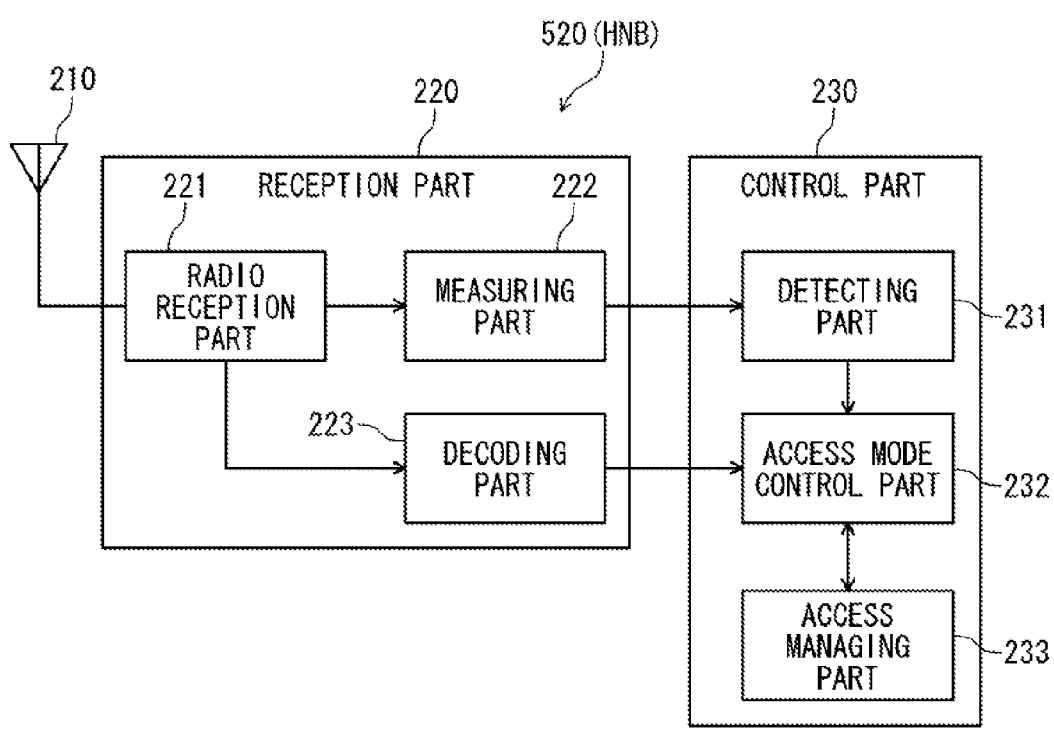
FIG. 2 is a block diagram showing an inner structure of a femtocell base station 520 of a first exemplary embodiment.

FIG. 2 is a block diagram showing an inner structure of the femtocell base station 520 of the first exemplary embodiment. The femtocell base station (HNB) 520 shown in FIG. 2 includes an antenna 210, a reception part 220 and a control part 230. The reception part 220 includes a radio reception part 221, a measuring part 222 and a decoding part 223. The control part 230 includes a detecting part 231, an access mode control part 232 and an access managing part 233.

The radio reception part 221 of the reception part 220 receives an uplink radio signal from the radio terminal 500 located near the femtocell base station 520 through the antenna 210. Further, when the radio reception part 221 receives the uplink radio signal from the radio terminal (a femtocell user: HUE) 500 connected to the femtocell base station 520, the radio reception part 221 carries out a predetermined demodudating process individually for a user.

The measuring part 222 of the reception part 220 periodically measures an uplink received total power (RTWP: Received Total Wideband Power) in accordance with the uplink radio signal received by the radio reception part 221. The measuring part 222 outputs a measured value to the detecting part 231 of the control part 230.

The decoding part 223 of the reception part 220 decodes uplink data individual for the user obtained by demodulating the uplink radio signal by the radio reception part 221 in a predetermined mode. Further, when a propagation loss (a path loss) between the femtocell base station 520 and the radio terminal connected to the femtocell base station 520 is informed from the radio terminal, the decoding part 223 outputs a result obtained by decoding the uplink data including the information to the access mode control part 232.

When a state where the uplink received total wideband power (RTWP) measured by the measuring part 222 of the reception part 220 is a predetermined value or higher is kept continuously for a predetermined duration or more after the received total wideband power (RTWP) reaches the predetermined value or higher, the detecting part 231 of the control part 230 decides that a radio terminal (a visitor macrocell user: vMUE) connected to the macrocell base station 510 which is located in the vicinity of the femtocell base station 520 cannot carry out a different frequency hand over. At this time, the detecting part 231 recognizes that the visitor macrocell user (vMUE) is detected. The predetermined duration indicates an average time required, for instance, for the radio terminal 500 to carry out the different frequency hand over after the radio terminal 500 searches different frequency cells. Namely, during the predetermined duration, the visitor macrocell user (vMUE) searches the different frequency cells.

The detecting part 231 may change a length of the predetermined duration in accordance with an operating state of the station of its own (the femtocell base station 520). The operating state of the station of its own indicates at least one of total values of predetermined throughputs based on, for instance, the number of the radio terminals connected to the station of its own and QoS (Quality of Service) required for the station of its own.

On the other hand, when the received total wideband power (RTWP) is the predetermined value or lower before the predetermined duration elapses after the received total wideband power (RTWP) reaches the predetermined, value or higher, the detecting part 231 decides that the radio terminal (MITE) carries out the different frequency hand over. At this time, the detecting part 231 recognizes that the visitor macrocell user (vMUE) cannot be detected. The detecting part 231 outputs a detected result of the visitor macrocell user (vMUE) in the vicinity of the femtocell base station 520 to the access mode control part 232.

When the detecting part 231 detects the macrocell user MUE, the detecting part 231 may calculate an uplink interference power in place of the above-described received total wideband power (RTWP) and compare the uplink interference power with a predetermined value. The uplink interference power is obtained by subtracting power of desired wave signals of all the femtocell users (HUE) which carry out an uplink transmission to the femtocell base station 520 from the received total wideband power (RTWP). The power of the desired wave signals is obtained by subtracting propagation losses between the femtocell base station 520 and the femtocell users (HUE) from an uplink transmission power of the femtocell users (HUE).

When the detecting part 231 uses the uplink interference power, the predetermined value to be compared with the uplink interference power may be a value obtained by subtracting a predetermined propagation loss from a supposed uplink transmission power to the macrocell base station 510 in a position of the femtocell base station 520. The predetermined propagation loss may be set in accordance with a size of a coverage area formed by the femtocell base station 520.

Further, when the detecting part 231 uses the uplink received total wideband power, the predetermined value to be compared with the received total wideband power may be a value offset from a received power in the femtocell base station 520 when the radio terminals connected to the femtocell base station 520 constantly carry out a data transmission of an uplink radio channel.

To the access mode control part 232 of the control part 230, the detected result of the visitor macrocell user (vMUE) is inputted from the detecting part 231. Further, to the access mode control part 232, an informed value of the propagation loss (the path loss) between the femtocell base station 520 and the radio terminal reported from the radio terminal connected to the femtocell base station 520 is inputted from the decoding part 223 of reception part 220.

Under a state where the femtocell base station 520 is operated by the CSG mode, when information inputted from the detecting part 231 shows that the visitor macrocell user (vMUE) is detected, the access mode control part 232 switches the femtocell base station 520 to the hybrid mode from the CSG mode. As a result, the visitor macrocell user (vMUE) can access the femtocell base station 520. On the other hand, when the information inputted from the detecting part 231 shows that the visitor macrocell user (vMUE) cannot be detected, the access mode control part 232 continuously operates the femtocell base station 520 by the CSG mode.

Figure 3:
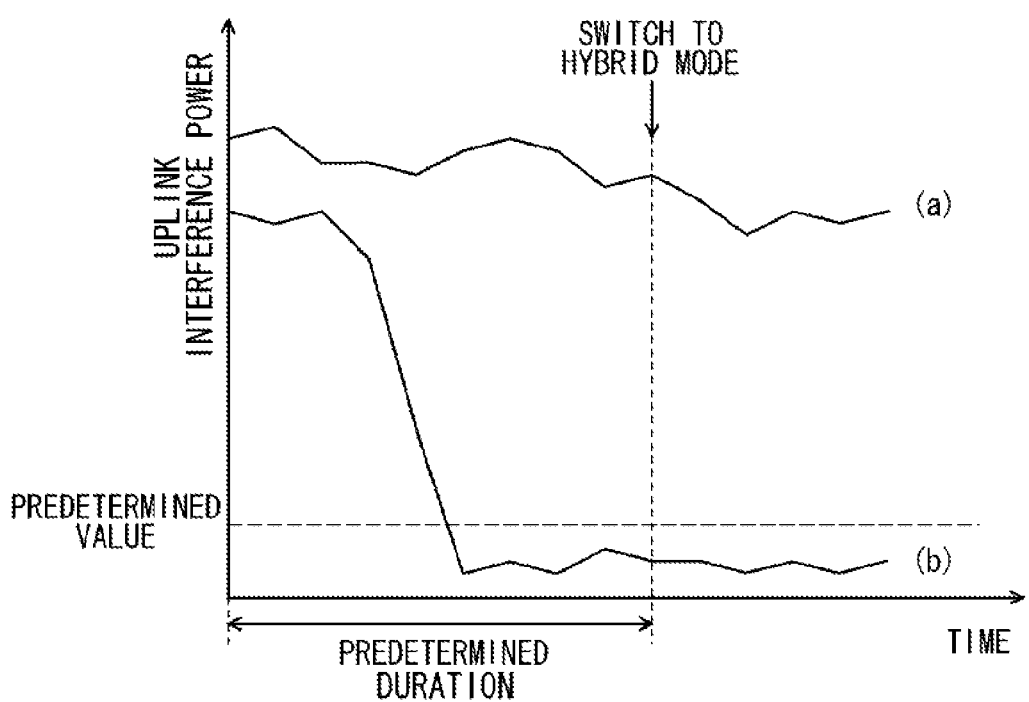
FIG. 3 is a graph showing one example (a) of a time change of an uplink interference power when the femtocell base station 520 is switched from a CSG mode to a hybrid mode and one example (b) of a time change of an uplink interference power when the femtocell base station 520 continuously retains the CSG mode.

FIG. 3 is a graph showing one example (a) of a time change of the uplink interference power when the femtocell base station 520 is switched from the CSG mode to the hybrid mode and one example (b) of a time change of the uplink interference power when the femtocell base station 520 continuously retains the CSG mode. As shown in the example (a) in FIG. 3, even when the predetermined duration elapses after it is observed that the uplink interference power is the predetermined, value or higher, if the uplink interference power is continuously the previous value or higher, the access mode control part 232 switches the femtocell base station 520 to the hybrid mode from the CSG mode. On the other hand, as shown in the example (b) in FIG. 3, when the uplink interference power is the predetermined value or lower before the predetermined duration elapses after it is observed that the uplink interference power is the predetermined value or higher, the access mode control part 232 continuously operates the femtocell base station 520 by the CSG mode.

Further, under a state where the femtocell base station 520 is operated by the hybrid mode, an identifier of a radio terminal (an unregistered radio terminal: non-CSG UE) which is not registered in the femtocell base station 520 is inputted to the access mode control part 232 from the below-described access managing part 233. The access mode control part 232 extracts data of the propagation loss reported from the unregistered radio terminal of data showing a report of the propagation loss (the path loss) between the femtocell base station 520 and the radio terminals connected to the femtocell base station 520 which is inputted from the decoding part 223. When all the extracted propagation losses are predetermined values or higher continuously for a predetermined duration or more, the access mode control part 232 switches the femtocell base station 520 to the CSG mode from the hybrid mode.

Figure 4:
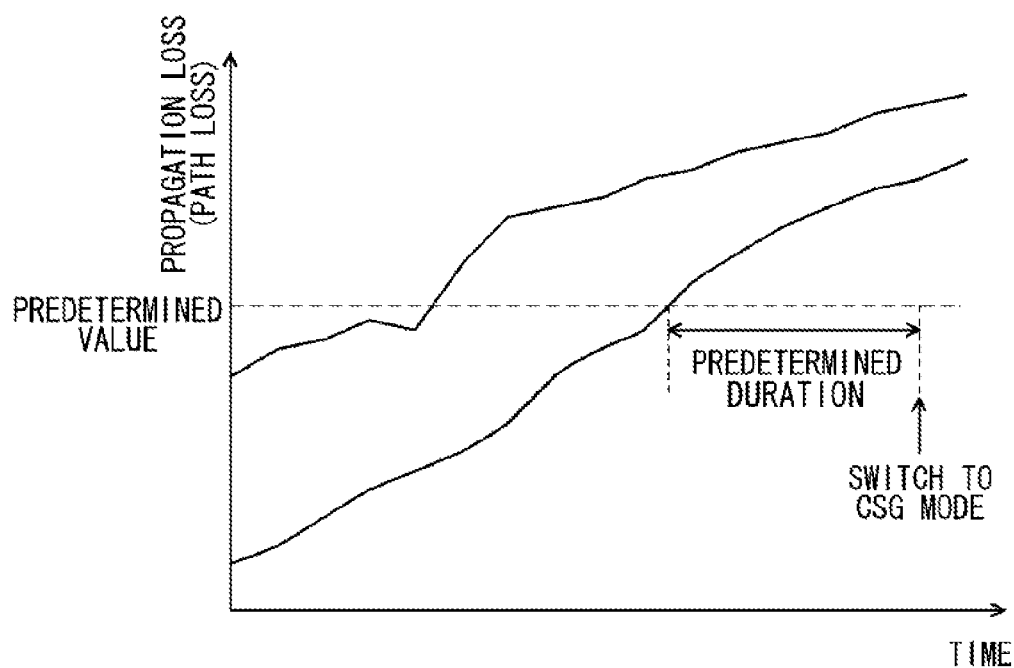
FIG. 4 is a graph showing one example of a time change of a propagation loss (a path loss) when the femtocell base station 520 is switched from the hybrid mode to the CSG mode.

FIG. 4 is a graph showing one example of a time change of the propagation loss (the path loss) when the femtocell base station 520 is switched from the hybrid mode to the CSG mode. FIG. 4 shows the example in which there are two unregistered radio terminals communicating with the femtocell base station 520 (visitor users to be connected to the femtocell base station 520 in the hybrid mode). As shown in FIG. 4, when the propagation losses of all the unregistered radio terminals are the predetermined values or higher continuously for the predetermined duration or more after the propagation losses of all the unregistered radio terminals become the predetermined values or higher, the access mode control part 232 decides that all the unregistered radio terminals are remote from the femtocell base station 520 to switch the femtocell base station 520 from the hybrid mode to the CSG mode. On the other hand, when the propagation loss of at least one unregistered radio terminal is the predetermined value or lower before the predetermined duration elapses after the propagation losses of all the unregistered radio terminals become the predetermined values or higher, the access mode control part 232 continuously operates the femtocell base station 520 by the hybrid mode.

The access managing part 233 of the control part 230 accumulates identifiers of radio terminals (registered radio terminals: CSG UE) registered in the femtocell base station 520. The radio terminals are registered in the access managing part 233 in accordance with input signals obtained by the use of an application by the femtocell base station 520 itself or information notified from a device of a core network which manages accesses of the radio terminals. Under a state where the femtocell base station 520 is operated by the hybrid mode, when the access managing part 233 receives an acquisition request signal of the identifiers of the registered radio terminals from the access mode control part 232, the access managing part 233 feeds back a registered state in the femtocell base station 520 to the access mode control part 232.

Figure 5:
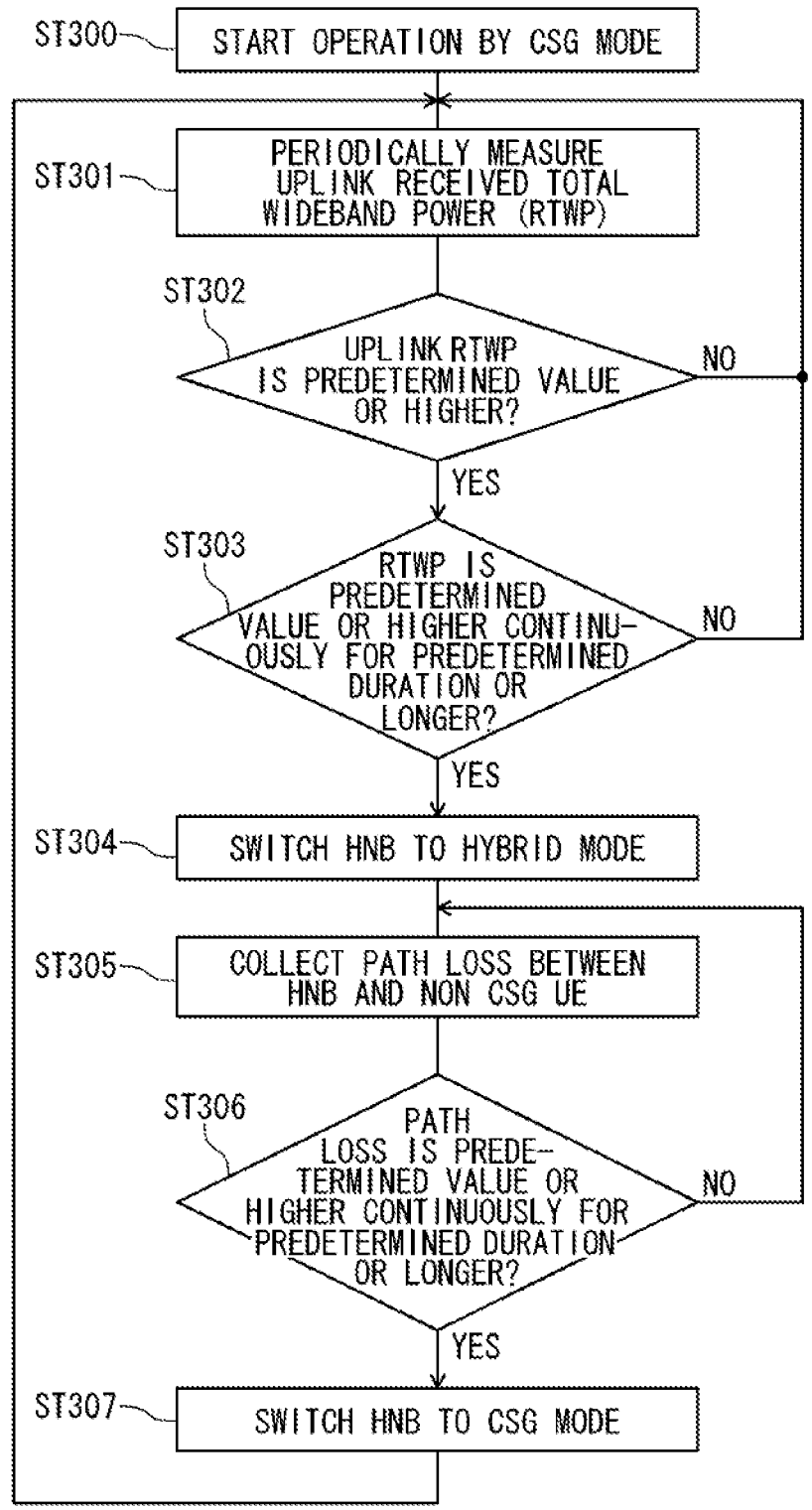
FIG. 5 is a flowchart for explaining an operation of the femtocell base station 520 in the first exemplary embodiment.

Now, referring to FIG. 5, an operation of the femtocell base station 520 will be described below. FIG. 5 is a flowchart for explaining the operation of the femtocell base station 520 in the first exemplary embodiment. When the femtocell base station 520 is provided, the femtocell base station 520 carries out a predetermined transmission power setting to start an operation by the CSG mode (step ST300). Then, the measuring part 222 of the femtocell base station 520 periodically measures the uplink received total wideband power (MVP) (step ST301).

Then, the detecting part 231 of the femtocell base station 520 decides whether or not the uplink received total wideband power (RTWP) is the predetermined value or higher (step ST302). As a result of the decision, when the received total wideband power (RTWP) is the predetermined value or higher, a procedure advances to step ST303, and when the received total wideband power is lower than the predetermined value, the procedure returns to the step ST301. In the step ST303, the detecting part 231 decides whether or not a state is retained that the received total wideband power (RTWP) is the predetermined value or higher continuously for the predetermined duration or longer after the received total wideband power (RTWP) reaches the predetermined value or higher. As a result of the decision, when the received total wideband power (RTWP) is the predetermined value or higher continuously for the predetermined, duration or longer, the procedure advances to step ST304. When the received total wideband power (RTWP) is the predetermined value or lower before the predetermined duration elapses, the procedure returns to the step ST301.

In the step ST304, the detecting part 231 of the femtocell base station 520 decides that the visitor macrocell user (vMUE) communicating with the macrocell base station 510 which is located in the vicinity of the femtocell base station 520 cannot carry out the different frequency hand over. The access mode control part 232 switches the femtocell base station 520 to the hybrid mode from the CSG mode. Consequently, the visitor macrocell user (vMUE) can access the femtocell base station 520.

In the step ST304, when the femtocell base station 520 is switched to the hybrid mode, the access mode control part 232 of the femtocell base station 520 collects the propagation losses (the path losses) between the femtocell base station 520 and the unregistered radio terminals reported from the radio terminals (the unregistered radio terminals: non-CSG UE or visitor users) which are not registered in the femtocell base station 520 among the radio terminals being connected to the femtocell base station 520 (step ST305).

Then, the access mode control part 232 decides whether or not the path losses of all the unregistered radio terminals are the predetermined values or higher continuously for the predetermined duration or longer (step ST306). As a result of the decision, when the path losses of all the unregistered radio terminals are the predetermined values or higher continuously for the predetermined duration or longer, the procedure advances to step ST307. When the path loss of at least one unregistered radio terminal, is the predetermined value or lower before the predetermined duration elapses, the procedure returns to the step ST305. In the step ST307, the access mode control part 232 decides that all the unregistered radio terminals are remote from the femtocell base station 520 to switch, the femtocell base station 520 from the hybrid, mode to the CSG mode. After the step ST307, the procedure returns to the step ST301.

Figure 6:
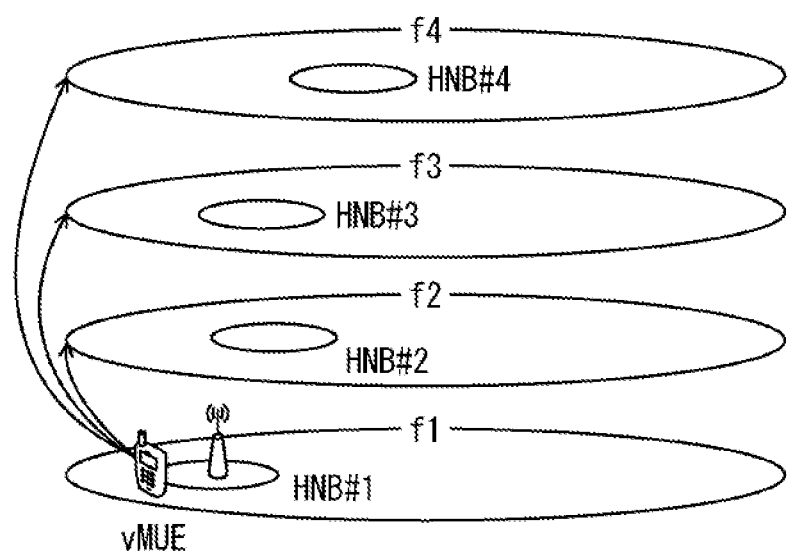
FIG. 6 is a diagram showing a situation that a visitor macrocell user (vMUE) cannot carry out a different frequency hand over.

As described above, in the present exemplary embodiment, when the radio terminal (the visitor macrocell user: vMUE) communicating with the macrocell base station 510 which is located in the vicinity of the femtocell base station 520 is in a state where the different frequency hand over cannot be carried out, the femtocell base station 520 shifts to the hybrid mode. For instance, as shown in FIG. 6, when all carrier frequencies f1 to f4 available in the system are used by the femtocell base stations HNB#1 to HNB#4 which are located closely to each other, since the visitor macrocell user vMUE cannot carry out the different frequency hand over, the femtocell base station HNB#1 shifts to the hybrid mode. When the femtocell base station shifts to the hybrid mode, the visitor macrocell user vMUE can access the femtocell base station. Accordingly, a throughput of the visitor macrocell user can be improved.

A decision as to whether or not the visitor macrocell user (vMUE) in the present exemplary embodiment can carry out the different frequency hand over is made by deciding whether or not the state is retained that the uplink received total wideband power (RTWP) or the uplink interference power measured by the femtocell base station 520 is the predetermined value or higher continuously for the predetermined duration after the uplink received total wideband power or the uplink interference power reaches the predetermined value or higher. On the other hand, in the method disclosed in Patent Literature 1, as described in the paragraphs 0034 to 0039 of Patent Literature 1, when the number of the mobile stations (the macrocell users) which access the radio base station for the home cell (the femtocell base station) operating in the limited state (the CSG mode) or the number of the mobile stations to which an access right to the radio base station for the home cell is given is lower than a predetermined number, the state of the radio base station for the home cell is switched to the semi-open state (the hybrid state). However, when the number of the mobile stations exceeds the predetermined number, the state of the radio base station for the home cell is switched to the limited state. In the present exemplary embodiment, the mode is not switched in accordance with the number of the radio terminals. When it is decided that the macrocell user cannot carry out the different frequency hand over, the femtocell base station is shifted to the hybrid mode. Accordingly, if the number of the visitor macrocell users is increased, the femtocell base station is not returned to the CSG mode (the limited state) as in Patent Literature 1.

Second Exemplary Embodiment

Figure 7:
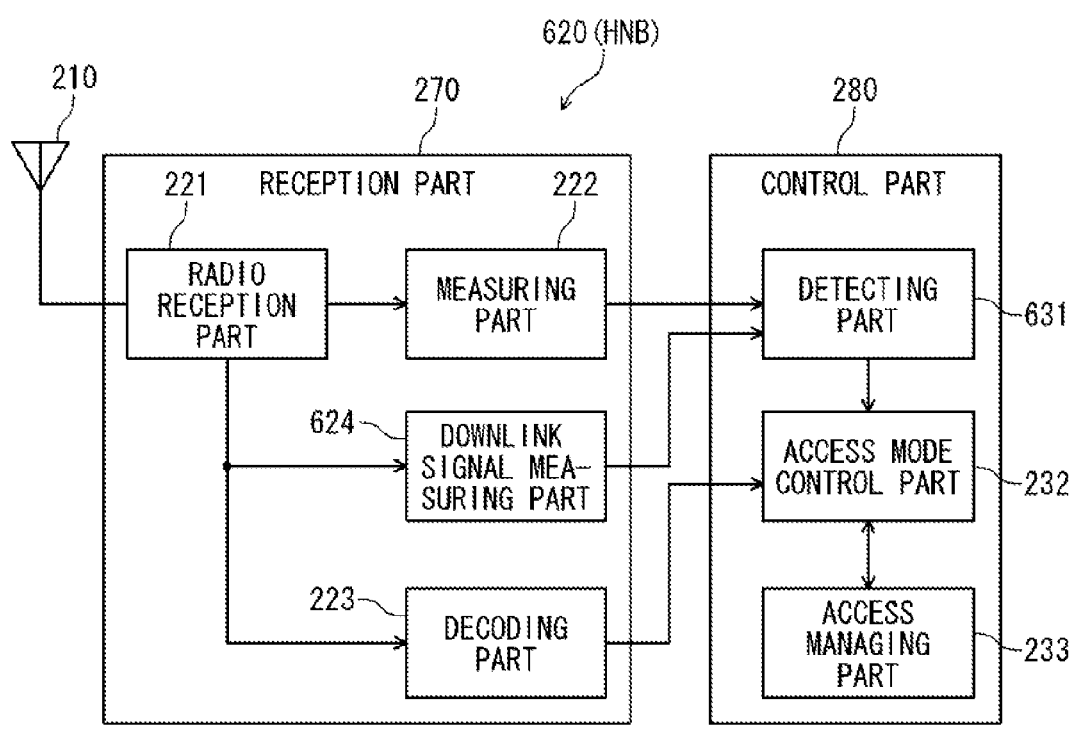
FIG. 7 is a block diagram showing an inner structure of a femtocell base station 620 in a second exemplary embodiment.

FIG. 7 is a block diagram showing an inner structure of a femtocell base station 620 in a second exemplary embodiment. The femtocell base station 620 of the second exemplary embodiment is different from the femtocell base station 520 of the first exemplary embodiment in view of a point that a reception part 270 has a downlink signal measuring part 624 and a detecting part 631 of a control part 280 uses information from the downlink signal measuring part 624. The second exemplary embodiment is the same as the first exemplary embodiment except the above-described point. In FIG. 7, component elements common to those of FIG. 2 are designated by the same reference numerals. Accordingly, to parts the same as or equivalent to those of the femtocell base station 520 of the first exemplary embodiment, the same marks or corresponding marks are attached to simplify or omit an explanation thereof.

The downlink signal measuring part 624 of the reception part 270 in the femtocell base station 620 according to the second exemplary embodiment has a cell search function for measuring a received power of a common pilot channel signal of all carrier frequencies of a downlink radio channel used in a system. A cell search of the present exemplary embodiment is applied to neighboring femtocell base stations except a macrocell base station as objects. The macrocell base station may be discriminated from the neighboring femtocell base stations by referring to transmission power information of a pilot channel included in system information (SIB: System Information Block) peculiar to cells transmitted by an information signal (BCH: Broadcast Channel) to extract the cells having a transmission power as high as that of the femtocell base station. When a group of scrambling codes (PSC: Primary Scrambling Code) peculiar to distributed cells is divided between the macrocell base station and the femtocell base stations, only the neighboring femtocell base stations may be extracted during an identification of the scrambling codes in a process of the cell search.

The downlink signal measuring part 624 carries out the cell search for each of the carrier frequencies to measure using states of the carrier frequencies by a group of the neighboring femtocell base stations. The measurement is executed, for instance, once for a day. The downlink signal measuring part 624 outputs a measured result to the detecting part 631 of the control part 280.

When the received power of the common pilot channel is a predetermined value or higher in all the carrier frequencies, the detecting part 631 of the control part 280 in the femtocell base station 620 according to the second exemplary embodiment decides that all the carrier frequencies are used by the femtocell base station of its own and the group of the neighboring femtocell base stations. At this time, the detecting part 631 decides that a visitor macrocell user (vMUE) cannot carry out a different frequency hand over, and recognizes that the visitor macrocell user (vMUE) is detected when an uplink received total wideband power (RTWP) or an uplink interference power measured by a measuring part 222 of the reception part 270 reaches a predetermined value or higher. The detecting part 231 of the first exemplary embodiment recognizes that the visitor macrocell user (vMUE) is detected when the state is retained, that the received total wideband power (RTWP) or the uplink interference power is the predetermined value or higher continuously for the predetermined duration or longer after the received total wideband power (RTWP) or the uplink interference power reaches the predetermined value or higher. However, in the present exemplary embodiment, when it is decided that all the carrier frequencies are used, it is recognized that the visitor macro user (vMUE) is detected without requiring the predetermined duration as in the first exemplary embodiment.

Figure 8:
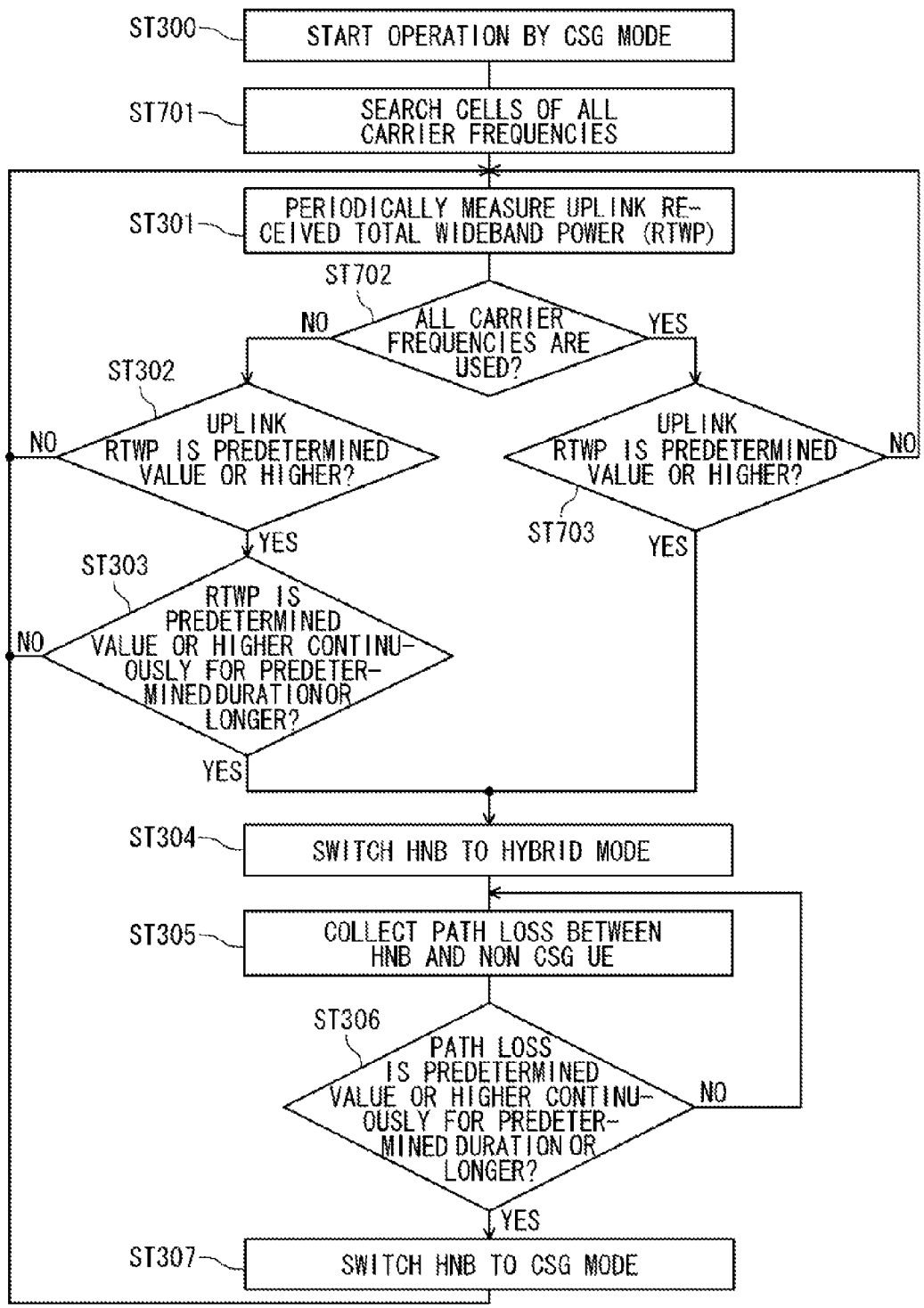
FIG. 8 is a flowchart for explaining an operation of the femtocell base station 620 in the second exemplary embodiment.

Now, by referring to FIG. 8, an operation of the femtocell base station 620 in the second exemplary embodiment will be described below. FIG. 8 is a flowchart for explaining the operation of the femtocell base station 620 in the second exemplary embodiment. In FIG. 8, to the same steps as those of FIG. 5, the same reference marks are attached to omit an explanation thereof. In the flowchart shown in FIG. 8, steps ST701 to ST703 are provided in addition to the steps ST300 to ST307 of the flowchart shown in FIG. 5.

When the femtocell base station 620 is provided, the femtocell base station 620 carries out step ST300 as performed in the first exemplary embodiment. Then, the downlink signal measuring part 624 of the femtocell base station 620 carries out the cell search of all the carrier frequencies for each of the carrier frequencies to the neighboring femtocell base stations except the macrocell base station as the objects (step ST701). Then, the measuring part 222 of the femtocell base station 620 carries out step ST301. Subsequently, the detecting part 631 of the femtocell base station 620 decides whether or not all the carrier frequencies are used by the femtocell base station of its own or the group of the neighboring femtocell base stations in accordance with a result of the cell search carried out in the step ST701 (step ST702). As a result of the decision, when all the carrier frequencies are used, a procedure advances to step ST703. When at least one among all the carrier frequencies is not used by the femtocell base stations, the procedure advances to step ST302. When the procedure advances to the step ST302, the same processes as those of the first exemplary embodiment are carried out. In the cell search of all the carrier frequencies for each of the carrier frequencies, the carrier frequency used by the femtocell base station 620 itself is supposed to be surely used, so that a cell search process may be omitted.

In the step ST703, the detecting part 631 decides whether or not the uplink received total wideband power (RTWP) reaches the predetermined value or higher. As a result of the decision, when the received total wideband power (RTWP) is the predetermined value or higher, the procedure advances to step ST304. When the received total wideband power (RTWP) is lower than the predetermined value, the procedure returns to the step ST301. Processes after the step ST304 are the same as those of the first exemplary embodiment.

As described above, in the present exemplary embodiment, when all the carrier frequencies are used by the femtocell base station of its own and the group of the neighboring femtocell base stations, since it is supposed that the visitor macrocell user cannot carry out the different frequency hand over, the femtocell base station 620 shifts to a hybrid mode when the uplink received total wideband power (MVP) or the uplink interference power reaches the predetermined value or higher. Accordingly, when the visitor macrocell user (vMUE) is detected, the predetermined duration described in the first exemplary embodiment is not required. As a result, the femtocell base station 620 immediately shifts to the hybrid mode. In such a way, since a time that a communication quality of the visitor macrocell user is deteriorated can be greatly shortened, a throughput of the visitor macrocell user can be more improved than the first exemplary.

Third Exemplary Embodiment

Figure 14:
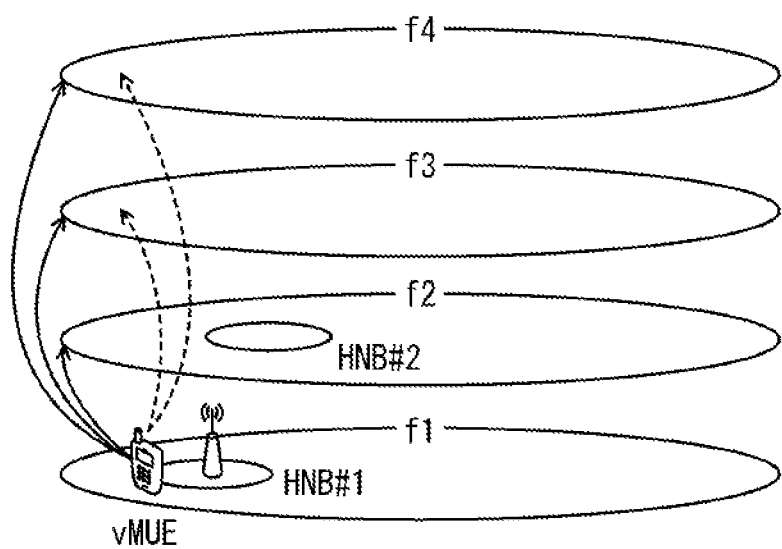
FIG. 14 is a conceptual diagram when a visitor micro call user searches different frequency cells to carry out a different frequency hand, over.

In the example shown in FIG. 14 that is described, in the section of Background Art, the visitor macrocell user vMUE searches the cells having the different frequencies to carry out the different frequency hand over to one of the carrier frequencies which is not used by the femtocell base stations. In this example, since the visitor macrocell user vMUE tries to carry out the different frequency hand over to each of the carrier frequencies, it takes a relatively long period to decide whether or not the different frequency hand over is successfully carried out. Further, a throughput of the visitor macrocell user vMUE is kept deteriorated until visitor macrocell user succeeds in the different frequency hand over. Further, a power is also consumed necessary for a process trying to carry out the different frequency hand over for each of the carrier frequencies.

In a radio communication system in a third exemplary embodiment, when a detecting part 631 decides that at least one of all carrier frequencies available in the system is not used by a femtocell base station in accordance with a measured result of a downlink signal measuring part 624 of the femtocell base station, the detecting part transmits auxiliary information for a different frequency hand over by a visitor macrocell user to a macrocell base station overlaid on the femtocell base station through a core network. Further, the in macrocell base station transmits the auxiliary information for the different frequency hand over transmitted from the femtocell base station to the visitor macrocell user.

Figure 9:
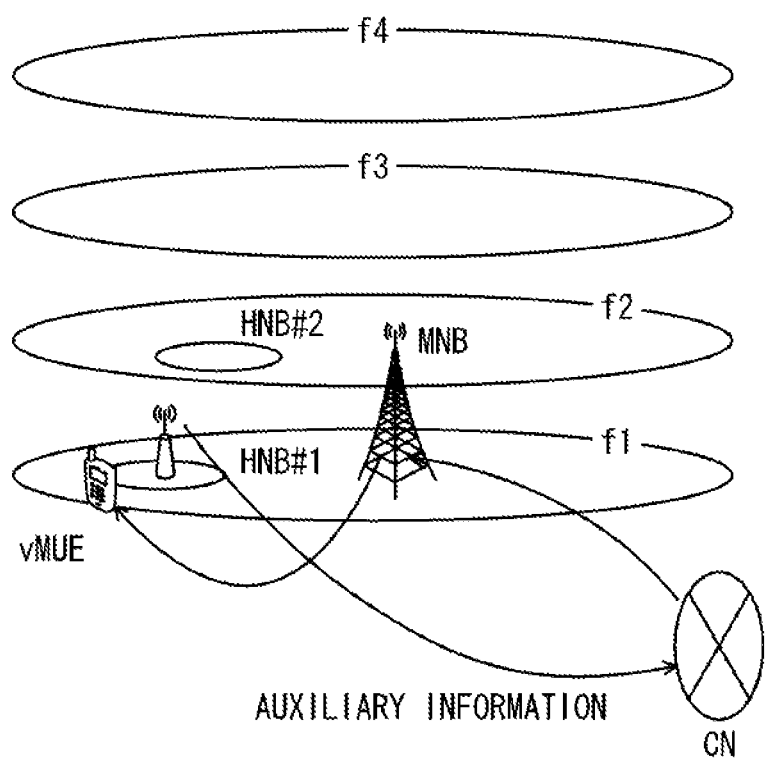
FIG. 9 is a diagram showing a situation that a visitor macrocell user (vMUE) can carry out a different frequency hand over.

For instance, as shown in FIG. 9, when the carrier frequencies f1 and f2 of all the carrier frequencies f1 to f4 available in the system are respectively used by the femtocell base stations HNB#1 and HNB#2, the femtocell base station HNB#1 transmits the auxiliary information for the visitor macrocell user vMUE to be handed over to the carrier frequency f3 or f4 to the macrocell base station MNB through the core network CN. Further, the macrocell base station MNB transmits the auxiliary information transmitted from the femtocell base station HNB#1 to the visitor macrocell user vMUE.

Figure 10:
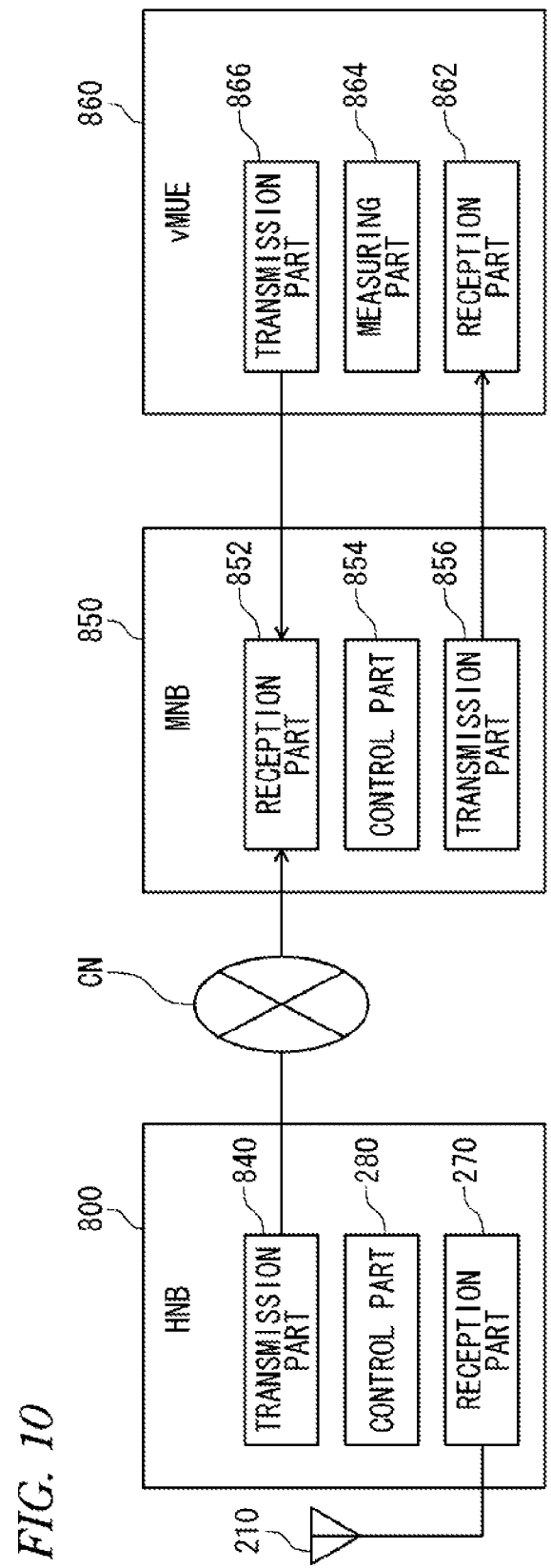
FIG. 10 is a block diagram showing a structure of a radio communication system in a third exemplary embodiment.

FIG. 10 is a block diagram showing a structure of the radio communication system in the third exemplary embodiment. As shown in FIG. 10, the radio communication system includes the femtocell base station (HNB) 800, the macrocell base station (MNB) 850 overlaid on the femtocell base station (HNB) 800 and the visitor macrocell user (vMUE) 860 communicating with the macrocell base station (MNB) 850 and located in a house in which the femtocell base station (HNB) 800 is provided. The femtocell base station (HNB) 800 is connected to the macrocell base station (MNB) 850 through the core network CN.

The femtocell base station (HNB) 800 includes a transmission part 840 in addition to the antenna 210, the reception part 270 and the control part 280 of the femtocell base station 620 of the second exemplary embodiment. The transmission part 840 transmits the auxiliary information for the different frequency hand over by the visitor macrocell user to the macrocell base station (MNB) 850 via the core network CN. The auxiliary information includes a detected result of the neighboring femtocell base stations operated by different frequencies based on a result of a cell search carried out by the downlink signal measuring part 624 of the reception part 270. The detected result of the neighboring femtocell base stations includes at least one or more of a received power of a common pilot channel signal from the neighboring femtocell base stations detected by the femtocell base station (HNB) 800, downlink scrambling codes used by the neighboring femtocell base stations and a neighbor cell list (NCL: Neighbour Cell List) held by the femtocell base station of its own. The femtocell base station (HNB) 800 may determine a designated cell as a place of the different frequency hand over of the visitor macrocell user and a designated frequency based on the result of the cell search and the transmission part 840 may transmit them to the macrocell base station (MNB) 850.

FIG. 11 is a conceptual diagram showing a data structure of the auxiliary information that the femtocell base station (HNB) 800 transmits to the macrocell base station (MNB) 850. As shown in FIG. 11, the auxiliary information includes a message type, an ID of an addressee macrocell base station (an addressee MNB) 850, an ID of a transmission source femtocell base station (a transmission source HNB) 800 and the neighbor cell list (NCL) held by the transmission source femtocell base station (the transmission source HNB) 800.

The message type included in the auxiliary information is a hit string showing the auxiliary information for the different frequency hand over of the visitor macrocell user (vMUE) 860. Further, the ID of the addressee macrocell base station (the addressee MNB) 850 is identifying information of the macrocell base station (MNB) 850 as an addressee of the auxiliary information. The ID of the transmission source femtocell base station (the transmission source HNB) 800 is identifying information of the femtocell base station (HNB) 800 as a transmission source for the auxiliary information.

The NCL includes a list of neighbor cells detected by the cell search of different frequency carriers periodically carried out by the femtocell base station 800 which transmits the auxiliary information and radio parameters of the neighbor cells (carrier frequencies, a common pilot transmission power, scrambling codes or the like). As described above, in place of the NCL, the auxiliary information may include at least one of information showing the received power of the common pilot channel signal from the neighboring femtocell base stations, the downlink scrambling codes used by the neighboring femtocell base stations, the designated cell as the place of the different frequency hand over and the designated frequency.

The macrocell base station (MNB) 850 includes a reception part 852, a control part 854 and a transmission part 856.

The reception part 852 receives the auxiliary information transmitted from the transmission part 840 of the femtocell base station (HNB) 800 via the core network CN. Further, the reception part 852 receives a report of a result of measurement of different frequencies carried out by the visitor macrocell user (vMUE) 860 in accordance with the auxiliary information from the visitor macrocell user (vMUE) 860.

To the control part 854, the auxiliary information from the femtocell base station (HNB) 800 received by the reception part 852 and the measured result from the visitor macrocell user (vMUE) 860 are inputted. When the control part 854 recognizes that the femtocell base station (HNB) 800 comes close to the visitor macrocell user (vMUE) 860 to each other, the control part coordinates them respectively. Further, the control part 854 determines a carrier frequency of the place of the different frequency hand over of the visitor macrocell user (vMUE) 860 in accordance with the measured result from the macrocell user (vMUE) 860, the auxiliary information from the femtocell base station (HNB) 800 or the designated cell notified from the femtocell base station (HNB) 800.

The transmission part 856 transmits information related to cell information or the carrier information of the place of the different frequency hand over of the visitor macrocell user (vMUE) 860 to the visitor macrocell user (vMUE) 860.

The visitor macrocell user (vMUE) 860 includes a reception part 862, a measuring part 864 and a transmission part 866.

The reception part 862 receives the information related to cell information or the carrier frequency of the place of the different frequency hand over transmitted from the macrocell base station (MNB) 850. Further, the reception part receives a downlink signal for measuring neighboring cells.

The measuring part 864 measures the different frequency carriers in accordance with the auxiliary information transmitted from the macrocell base station (MNB) 850. The measuring part 864 may apply a priority to a search of the different frequency carriers in accordance with the measured result by the femtocell base station (HNB) 800 and measure the different frequencies in accordance with the priority. When the designated frequency of the femtocell base station (HNB) 800 is included in the instruction from the macrocell base station (MNB) 850, the measuring part 864 preferentially measures primarily from the designated frequency.

The transmission part 866 informs the macrocell base station (MNB) 850 of the above-described measured result of the different frequencies.

Figure 12:
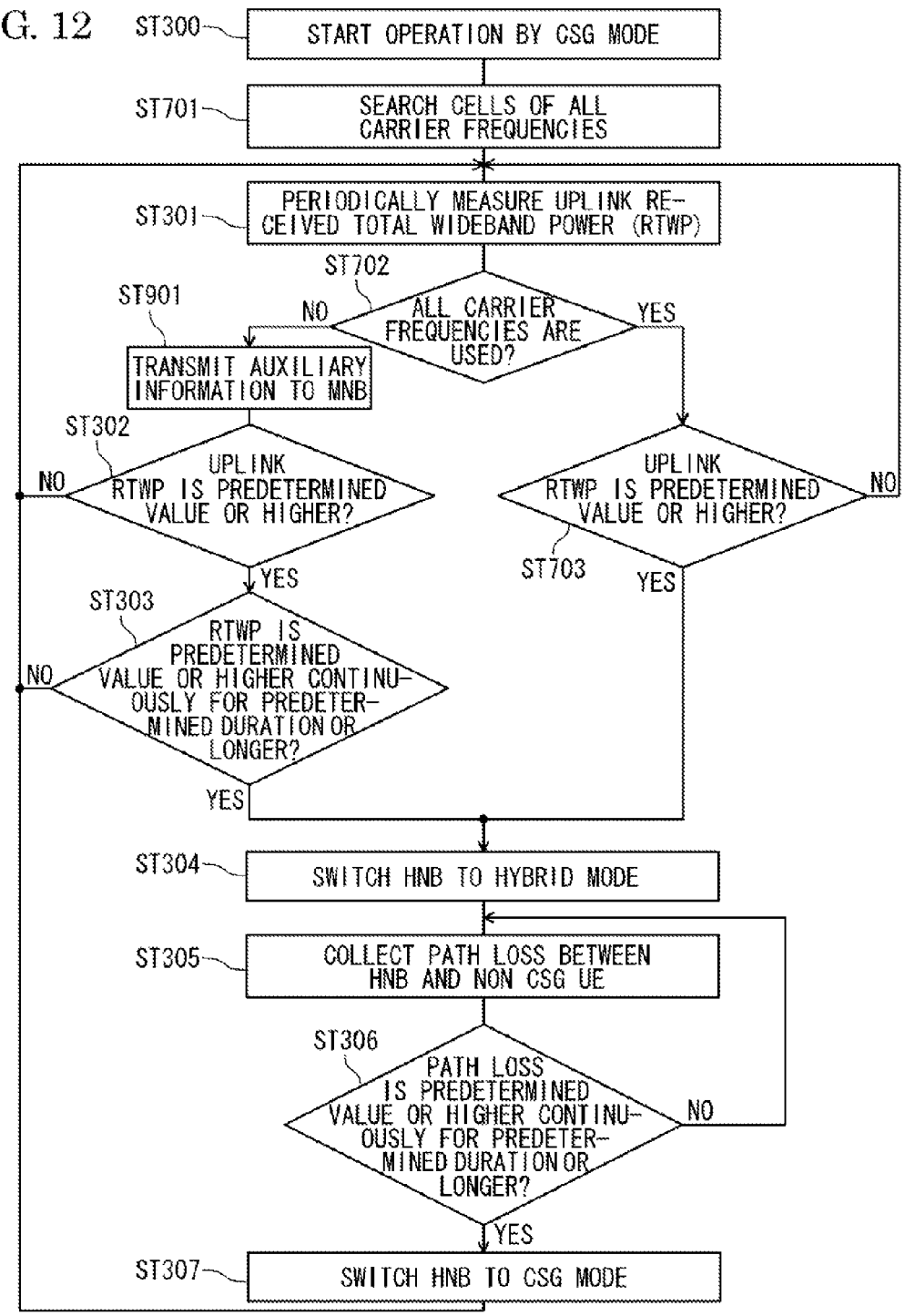
FIG. 12 is a flowchart for explaining an operation of the femtocell base station 800 in the third exemplary embodiment.
Figure 13:
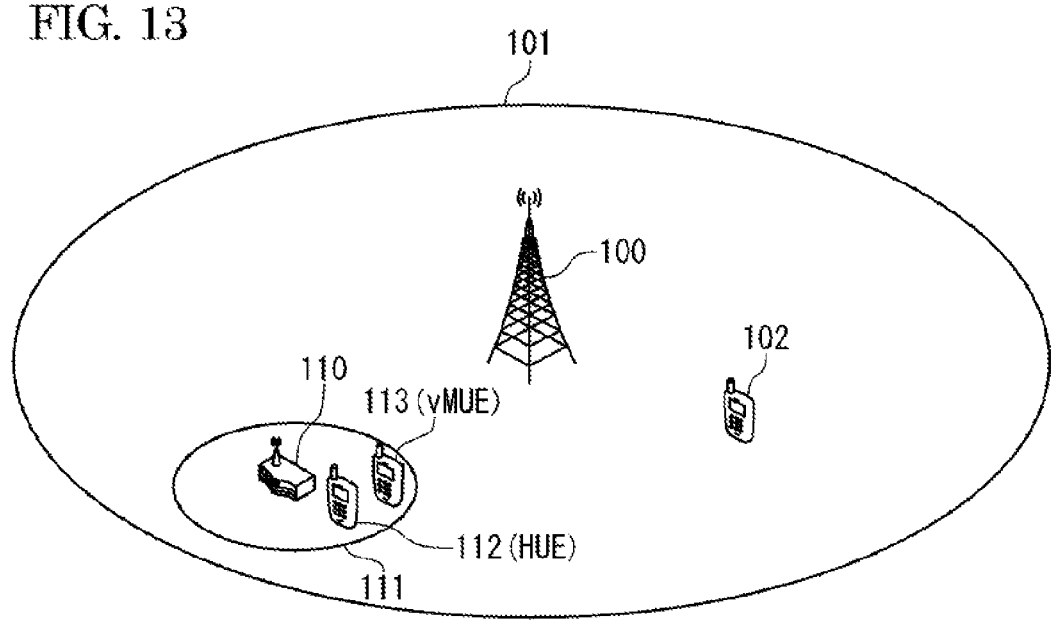
FIG. 13 is a diagram showing one example of a structure of a radio system in which a femtocell base station is provided, in a coverage area of a macrocell base station.

Now, referring to FIG. 12, an operation of the femtocell base station 800 in the third exemplary embodiment will be described below. FIG. 12 is a flowchart for explaining the operation of the femtocell base station 800 in the third exemplary embodiment. In FIG. 12, to the same steps as those of FIG. 8, the same reference marks are attached to omit an explanation thereof. In the flowchart shown in FIG. 12, step ST901 is provided in addition to the steps of the flowchart shown in FIG. 8.

In step ST702, when the detecting part 631 of the femtocell base station (HNB) 800 decides that at least one of all the carrier frequencies available in the system is not used by the femtocell base station, the transmission part 840 informs the macrocell base station (MNB) 850 overlaid thereon of the auxiliary information including the detected result of the neighboring femtocell base stations operated by the different frequencies (step ST901). After the step ST901, a procedure advances to step ST 302.

As described above, in the present invention, the femtocell base station (HNB) transmits the auxiliary information for the different frequency hand over to the visitor macrocell user (vMUE) via the core network CN and the macrocell base station (MNB). Thus, when a carrier frequency which only the macrocell base station uses exists in a periphery, the different frequency hand over of the visitor macrocell user (vMUE) can be carried out at high speed. In such a way, since the time that a communication quality of the visitor macrocell user (vMUE) is deteriorated can be greatly shortened, a throughput of the visitor macrocell user can be improved. Further, a consumed power necessary for the different frequency hand over of the macrocell user (vMUE) can be reduced.

Although the present embodiments have provided explanations by means of taking, as examples, a case where the present invention is configured by means of hardware, the present invention can also be implemented by software.

The respective function blocks used for describing the embodiments are typically implemented by LSIs that are integrated circuits. The function blocks can also be individually realized as single chips or as a single chip including some or all of the function blocks. Although the functional blocks are embodied as LSIs, they are sometimes called an IC, a system LSI, a super LSI, and an ultra-LSI according to a degree of integration.

The technique for integrating the function blocks into circuitry is not limited to LSI technology, and the function blocks can also be implemented by means of a custom-designed circuit or a general-purpose processor. Further, an FPGA (Field Programmable Gate Array) capable of being programmed after manufacture of an LSI and a reconfigurable processor whose connections or settings of circuit cells in an LSI can be reconfigured can also be utilized.

Further, if a technique for integrating circuits replaceable with the LSI technology by virtue of advancement of the semiconductor technology or another technique derived from advancement of the semiconductor technology has emerged, the function blocks can naturally be integrated by use of the technique. Adaptation of biotechnology is feasible.

Although the present invention has been described in detail based on particular embodiments, it is apparent to those skilled in the art that various changes and modifications may be made without departing from the spirit and scope of the present invention.

The present patent application is based on Japanese Patent Application (No. 2010-174579) filed on Aug. 3, 2010, the contents of which are incorporated herein by reference.

INDUSTRIAL APPLICABILITY

The femtocell base station according to the present invention is useful as a radio base station which reduces an interference of a downlink line to the visitor macrocell user from the femtocell base station.

REFERENCE SIGNS LIST

500: radio terminal (UE)
510, 850: macrocell base station (MNB)
520, 620, 800: femtocell base station (HNB)
210: antenna
220, 270: reception part
230, 280: control part
221: radio reception part
222: measuring part
223: decoding part
231: detecting part
232: access mode control part
233: access managing part
624: downlink signal measuring part
860: visitor macrocell user (vMUE)

The invention claimed is:

1. A femtocell base station in a radio communication system having:
    a macrocell base station which can communicate with radio terminals using any of a plurality of carrier frequencies; and
    at least one femtocell base station provided in a macrocell in which the macrocell base station can communicate with the radio terminals, and capable of communicating with the radio terminals in an access limited mode in which only a specific radio terminal can access or a hybrid mode in which an access is not limited only to the specific radio terminal using any of the plurality of carrier frequencies,
    the femtocell base station comprising:
    a measuring part which measures an uplink total received power from a radio terminal;
    a detecting part which detects a visitor macrocell radio terminal located in a vicinity of the femtocell base station operated by the access limited mode in accordance with the uplink total received power or an uplink interference signal power which can be derived from the uplink total received power; and
    a control part which switches the femtocell base station from the access limited mode to the hybrid mode when the detecting part detects the visitor macrocell radio terminal.

2. The femtocell base station according to claim 1, wherein the detecting part recognizes that the visitor macrocell radio terminal is detected when a state is kept that the uplink total received power or the uplink interference signal power is a predetermined value or higher continuously for a predetermined duration or longer after the uplink total received power or the uplink interference signal power reaches the predetermined value or higher.

3. The femtocell base station according to claim 1, comprising a cell search part which carries out a cell search of all carrier frequencies on neighboring femtocell base stations as targets, wherein the detecting part recognizes that the visitor macrocell radio terminal is detected when the detecting part decides that all of the plurality of carrier frequencies are used by the femtocell base station and the neighboring femtocell base stations in accordance with a result of a search by the cell search part and if the uplink total received power or the uplink interference signal power is a predetermined value or higher.

4. The femtocell base station according to claim 3, comprising a transmission part which transmits auxiliary information to the visitor macrocell radio terminal through the macrocell base station when the detecting part decides that at least one of the plurality of carrier frequencies is not used by the femtocell base station in accordance with the result of the cell search of the cell search part, wherein the auxiliary information is information for handing over to another carrier frequency by the visitor macrocell radio terminal.

5. The femtocell base station according to claim 1, wherein the uplink interference signal power is derived by subtracting an uplink received power from the specific radio terminal previously registered in the femtocell base station from the uplink total received power.

6. The femtocell base station according to claim 2, wherein the predetermined duration indicates an average time required for the radio terminal to search a macrocell having another carrier frequency different from the carrier frequency used by the radio terminal and then hand over to the other carrier frequency.

7. The femtocell base station according to claim 1, comprising an obtaining part which obtains a propagation loss between the visitor macrocell radio terminal connected to the femtocell base station operated by the hybrid mode and the femtocell base station, wherein the control part switches the femtocell base station from the hybrid mode to the access limited mode when all propagation losses of the visitor macrocell radio terminal connected to the femtocell base station which are obtained by the obtaining part become a predetermined value or higher continuously for a predetermined duration or longer.

8. An access mode switching method carried out in a radio communication system having:

a macrocell base station which can communicate with radio terminals using any of a plurality of carrier frequencies; and at least one femtocell base station provided in a macrocell in which the macrocell base station can communicate with the radio terminals, and capable of communicating with the radio terminals in an access limited mode in which only a specific radio terminal can access or a hybrid mode in which an access is not limited only to the specific radio terminal using any of the plurality of carrier frequencies, the access mode switching method comprising:

measuring an uplink total received power from a radio terminal; and switching the femtocell base station from the access limited mode to the hybrid mode when a visitor macrocell radio terminal located in a vicinity of the femtocell base station operated by the access limited mode is detected in accordance with the uplink total received power or an uplink interference signal power which can be derived from the uplink total received power.

* * * * *